United States Patent
Krampe

[11] Patent Number: 6,079,104
[45] Date of Patent: Jun. 27, 2000

[54] STRIPPING TOOL

[76] Inventor: Josef Krampe, An der Vogelrute 34, D-59387 Ascheberg, Germany

[21] Appl. No.: 09/187,039

[22] Filed: Nov. 6, 1998

[30] Foreign Application Priority Data

Aug. 18, 1998 [DE] Germany .................. 298 14 771 U

[51] Int. Cl.[7] .................................................. H02G 1/12
[52] U.S. Cl. .......................... 30/90.1; 30/90.4; 30/123; 30/162; 81/9.44
[58] Field of Search .............................. 30/90.6, 90.1, 30/91.2, 91.1, 90.4, 123, 162; 81/9.44; 7/107, 158

[56] References Cited

U.S. PATENT DOCUMENTS

| | | | |
|---|---|---|---|
| 2,120,398 | 6/1938 | Edwards et al. | 30/90.6 X |
| 2,683,308 | 7/1954 | Cook, Jr. | 30/91.1 |
| 2,735,175 | 2/1956 | Tallman | 30/91.2 |
| 3,448,518 | 6/1969 | Sklar | 30/162 |
| 4,081,871 | 4/1978 | Knuth | 7/107 |
| 4,337,576 | 7/1982 | Drost et al. | 30/162 |
| 4,587,731 | 5/1986 | Krampe | 30/90.1 |
| 4,905,373 | 3/1990 | Krampe | 30/90.6 |
| 4,986,148 | 1/1991 | Krampe | 30/90.1 X |

FOREIGN PATENT DOCUMENTS

| | | | |
|---|---|---|---|
| 3222326 | 7/1987 | Germany . | |
| 3310523 | 7/1987 | Germany . | |
| 3904323 | 8/1990 | Germany | 30/90.1 |

Primary Examiner—M. Rachuba
Assistant Examiner—Dominic Troiano
Attorney, Agent, or Firm—Browdy and Neimark

[57] ABSTRACT

The stripping tool for removing the insulations of single- or multicore electrical cables provided with multiple layers of insulation has two trough-shaped jaws (4, 5), which are hinged together and can pivot toward one another. In a common tool end face, the two jaws (4, 5) have two stripping blades (6, 7) that extend transversely to the longitudinal direction of the jaws, the blades having cutters (8, 9), which are disposed with different gap spacing (S1, S2) from one another, for stripping the outer cable insulation and an inner cable-core insulation. At one jaw (4), a cutting blade (10) is held on the inside so as to be displaced in a guide, the blade extending in the longitudinal direction of the jaw and being extendable out of the tool end face opposite the blades (6, 7) into a functional position for separating insulation fibers (3) between the outer and inner insulations.

12 Claims, 4 Drawing Sheets

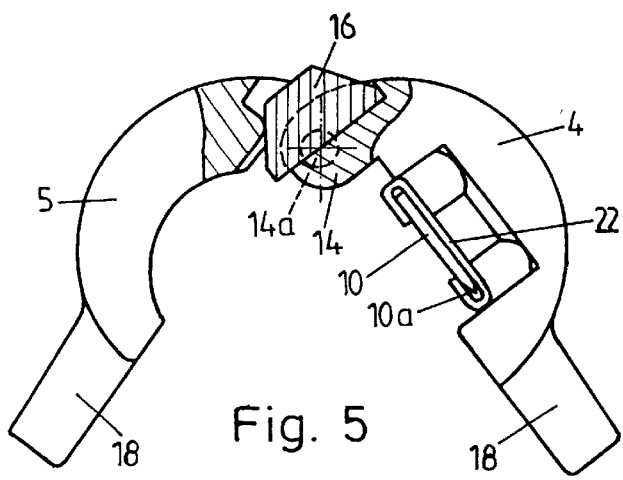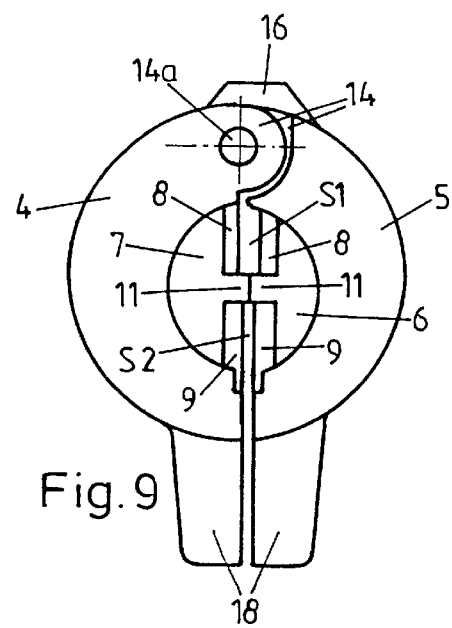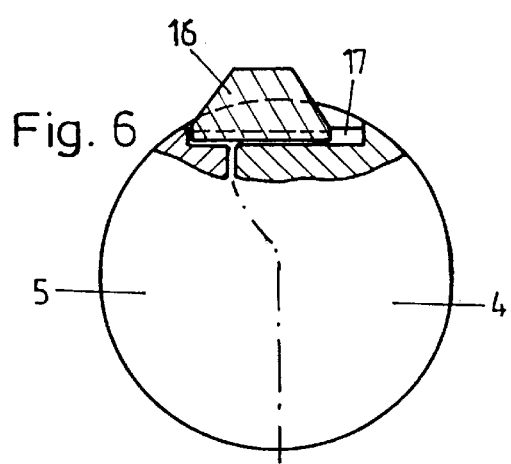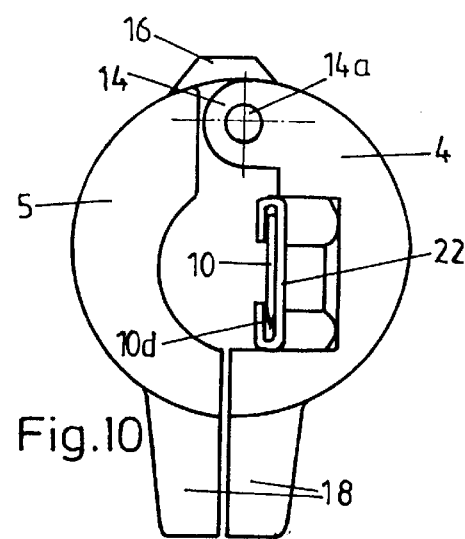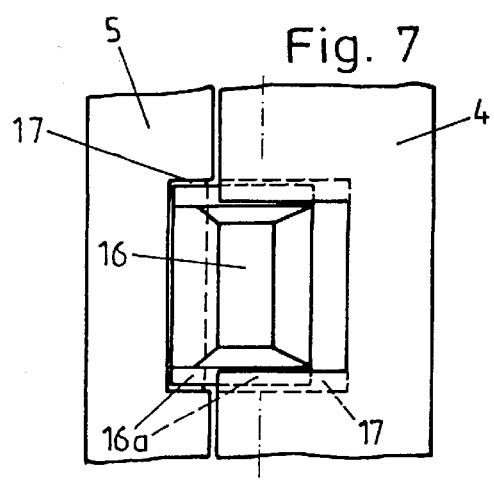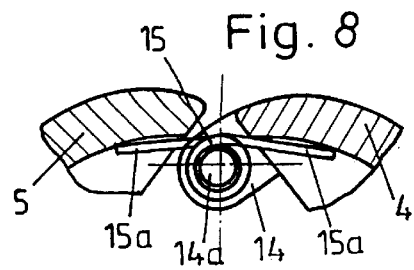

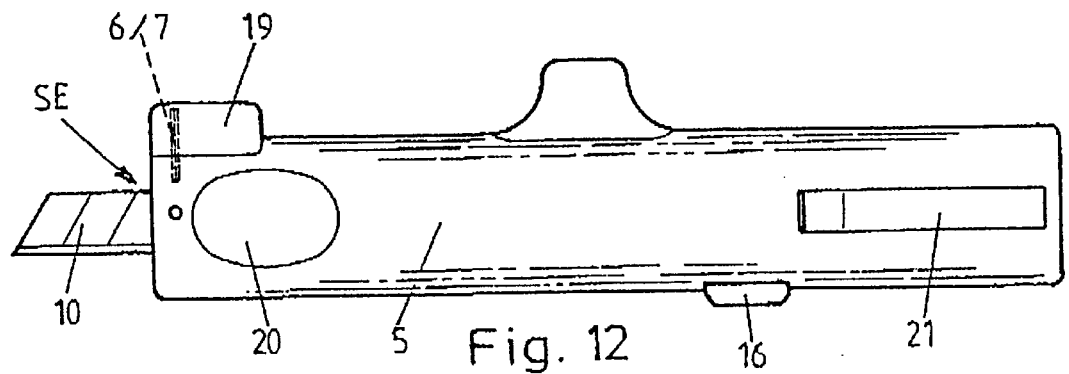
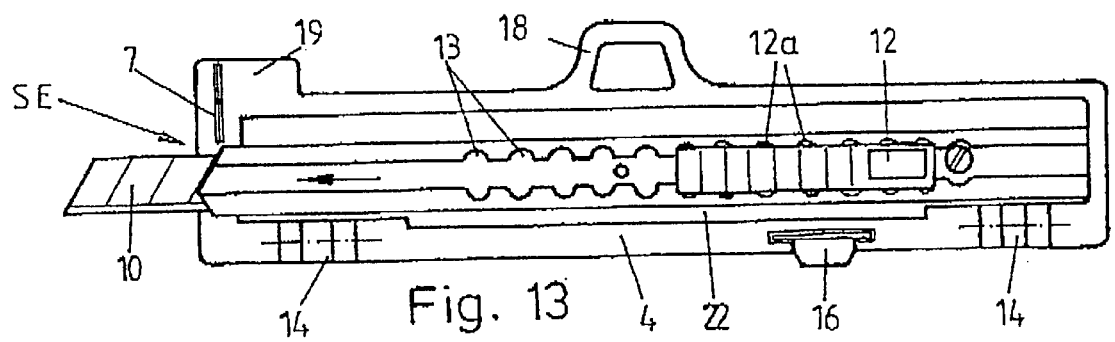
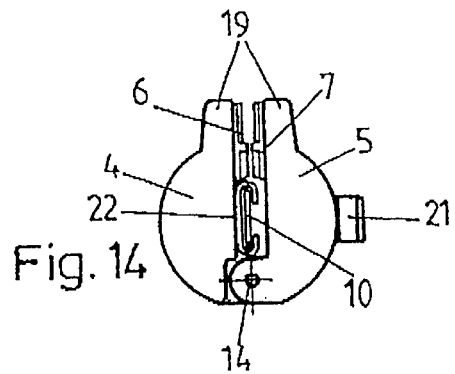

STRIPPING TOOL

BACKGROUND OF THE INVENTION

1. Technical Field of the Invention

The invention relates to a stripping tool for removing the insulations of single- or multicore electrical cables provided with multiple layers of insulation, the tool having two trough-shaped jaws with stripping blades, which jaws are hinged together and can pivot toward one another.

2. Prior Art

A stripping tool of this type is known from DE 32 22 326 C2 and DE 33 10 523 C2, and has proven useful in practice.

OBJECT AND SUMMARY OF THE INVENTION

It is the object of the invention to improve such a stripping tool such that it permits the embodiment of an additionally functional, universal, multi-function tool with respect to the state of the art, has a simple and low-cost design, is easy to handle and operates reliably.

The stripping tool of the invention has a simple, low-cost design, is easy to handle and operates reliably.

This stripping tool is equipped in a simple manner with simple means for performing three functions: it permits the stripping of insulation of varying thicknesses, that is, the outer cable insulation and the inner core insulation, and further allows severing of the insulation fibers between the insulations.

This tool represents a universal tool, with operating functions that are advanced over the state of the art, and has a high service value for craftsmen as well as nonprofessionals.

BRIEF DESCRIPTION OF THE DRAWINGS

An embodiment of the invention is illustrated in the drawings and described in detail below.

FIG. 5 shows a front view, partially in section, of the two open jaws with the cutting blade and interlocking bar;

FIG. 6 shows a front view, partially in section, of the tool with the interlocking bar in the closed position;

FIG. 7 shows a plan view of the interlocking bar holding the two jaws together;

FIG. 8 shows a cross-section through the pivotable seating of the two jaws with a compression spring;

FIG. 9 shows an enlarged front view of the tool with two pairs of cutters (cutting edges) having different gap spacing;

FIG. 10 shows an enlarged front view of the tool with the extendable cutting blade;

FIG. 12 shows a side view of the stripping tool in a further embodiment including blades that are disposed in the same end face and a cutting blade that can be pushed out;

FIG. 13 shows an inside view of a jaw of the stripping tool of FIG. 12; and

FIG. 14 shows a front view of the stripping tool of FIG. 12 from the front side, in which the blades lie and from which the cutting blade can be extended.

DETAILED DESCRIPTION OF THE PREFERRED EMBODIMENT(S) OF THE INVENTION

Figure 1:
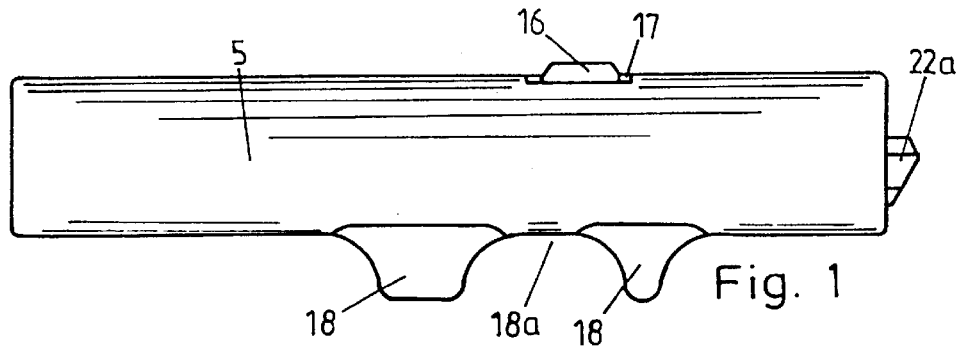
FIG. 1 shows a side view of a stripping tool.

The stripping tool for removing the insulations (1, 2, 3) of single- or multicore electrical cables (K) provided with multiple layers of insulation (see FIG. 11) has two trough-shaped jaws (4, 5) that are hinged together and pivot toward one another, and give the tool an oblong-tube shape with a circular cross section. In a common tool end face, the two jaws (4, 5) have two stripping blades (6, 7) having cutters (or, cutting edges) (8, 9), which are disposed with different gap spacing (S1, S2) from one another, for stripping the outer cable insulation (1) and an inner cable-core insulation (2).

At one jaw (4), a cutting blade (10) is held on the inside so as to be slidable in a guide; this blade extends in the longitudinal direction of the jaw and can be pushed out of the tool end face opposite the blades (6, 7) into a functional position (FIG. 4) for separating or cutting insulation fibers (3) between the outer and inner insulations (1, 2).

The two blades (6, 7) secured opposite one another in a respective jaw (4, 5) have, on both sides of two catches (or, stops) (11) that meet in the stripping position, four cutting edges (8, 9), with two having the larger gap spacing (S1) and two having the smaller gap spacing (S2), for stripping the insulations (1, 2), which are of different thicknesses.

The cutters (8, 9) of the two cutter pairs extend parallel to one another; the two stops (11) are located approximately in the middle of the blade length, and the two cutter pairs (8, 9) are of about equal length.

The blades (6, 7) lie in a common plane perpendicular to the longitudinal axis of the jaws (4, 5).

The cutting blade (10) is embodied as an oblong strip blade with break-off blade segments (10a).

A guide rail (22) having a C-shaped cross section for the cutting blade (10) is secured on the inside at one jaw (4), and the cutting blade (10) has a sliding handle (12) and is displaced in increments (inward into the non-operative position and outward into the functional position) with the sliding handle (12), which, with its latching projections (12a), engages a latch (13) with latch recesses of the guide rail (22).

Figure 2:
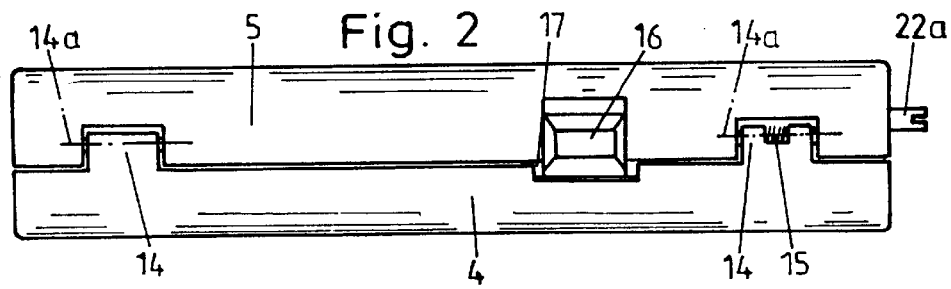
FIG. 2 shows a plan view of the stripping tool formed from two pivotally-connected jaws.
Figure 4:
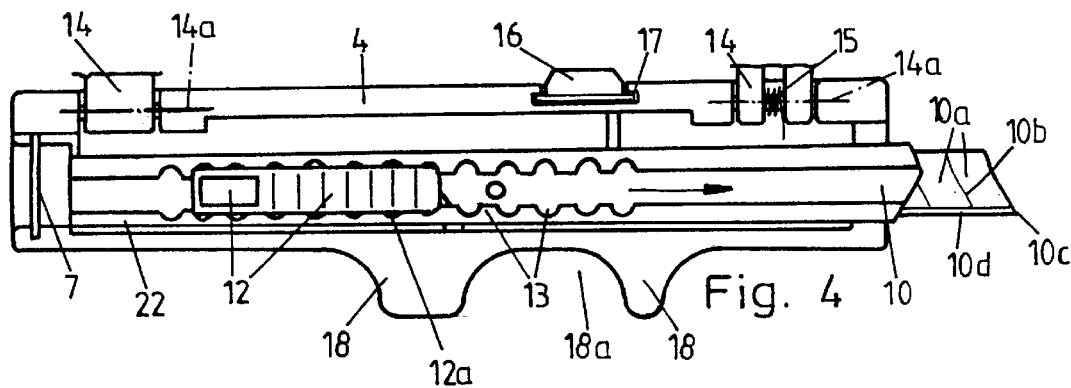
FIG. 4 shows an inside view of the same jaw with the cutting blade in the extended functional position.

FIG. 2 shows the non-operative, or retracted, position, and FIG. 4 shows the extended, functional position, of the cutting blade (10). The cutting blade (10) and its break-off blade segments (10a) have diagonal break-off lines (10b), which give the respectively-active blade segment (10a) a diagonal tip (10c). From the tip (10c), the blade edge (10d) extends along the lower edge of the cutting blade (10) and thus the blade segments (10a).

Figure 3:
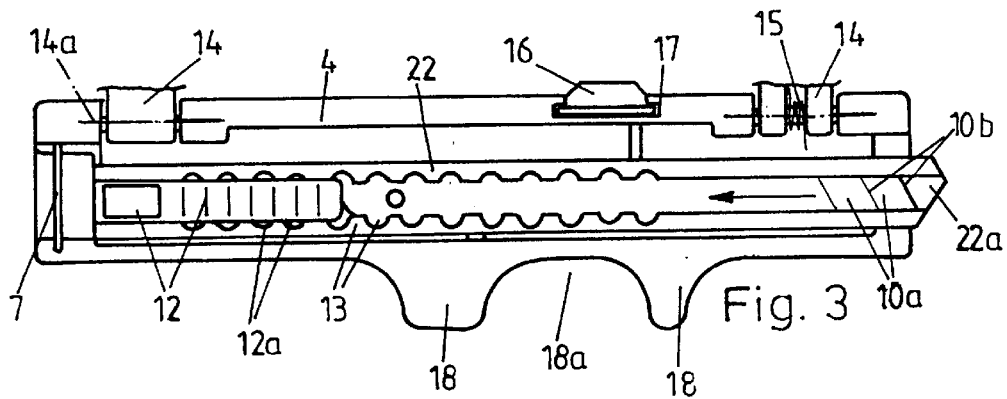
FIG. 3 shows an inside view of a trough-shaped jaw of the stripping tool, with cutters and a displaceable cutting blade, in the retracted position of the cutting blade (the second jaw is shown broken off in the hinges)

The guide rail (22) extends over virtually the entire length of the jaw, and ends, on the one hand, with spacing in front of the blades (6, 7) and projects slightly, with one guide end (22a), from the other end face for guiding the blade during operation, on the other hand (FIGS. 3 and 4).

The two jaws (4, 5) forming semicircular troughs are connected to one another so as to be separated and brought together by one or more hinges (14) lying along the same longitudinal axis (14a) in one jaw edge, and a compression spring (15) that pivots the jaws (4, 5) open is disposed around at least one hinge (14), the spring being seated around the hinge axis (14a) as a leg spring and pressing inwardly with its legs (15a) against the jaws (4, 5). The jaws (4, 5) are stopped against one another in the closed position by an interlocking bar (16).

The interlocking bar (16) is embodied as a handle piece with a T-shaped or dovetail-shaped cross section, and is held so as to be displaced, transversely to the longitudinal direction of the jaws, with sliding strips (16a) in a groove (17) extending in the two jaws (4, 5).

FIG. 6 shows the stopped position of the closed jaws (4, 5), with the interlocking bar (16) extending into each jaw (4, 5). To pivot the jaws (4, 5) open in order to position the cable (K) or displace the cutting blade (10) in the longitudinal direction, the interlocking bar (16) in the groove (17) is pushed into a jaw (4 or 5), so that it exits the other jaw (5 or 4) and the compression spring (14) can pivot open the unlocked jaws (4, 5) (FIGS. 5 and 8).

Figure 11A:
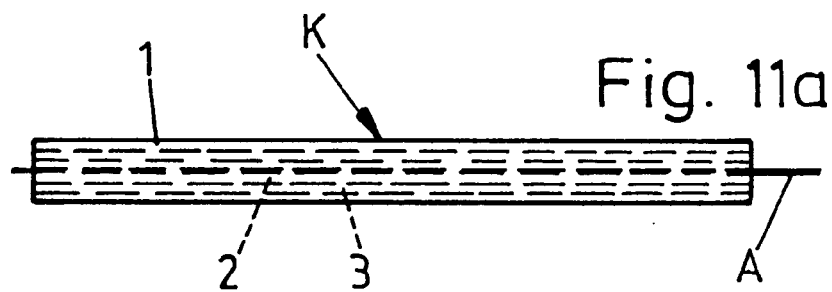
FIGS. 11a–11d shows side views of the steps for stripping the cable.
Figure 11B:
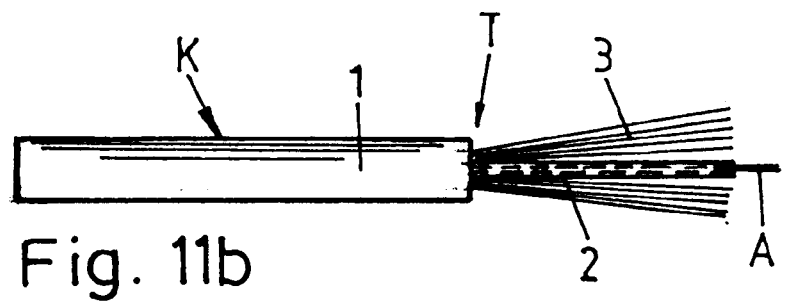
Figure 11C:
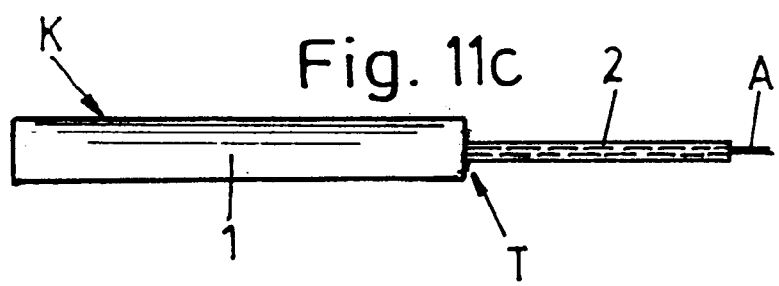

In accordance with FIG. 11a, the cable (K) to be stripped is laid in the open tool, in the longitudinal direction, and, for removal of the outer insulation (1) by the closing of the jaws (4, 5), the cable is separated between the cutters (8) of the two blades (6, 7) having a large spacing (S1) between themselves, in that the cutters (8) penetrate the insulation (1) and cut into it; through the rotation of the tool or the cable (K), the insulation (1) is cut into over its entire circumference and can be removed from the cable (K) (FIG. 11b).

Figure 11D:
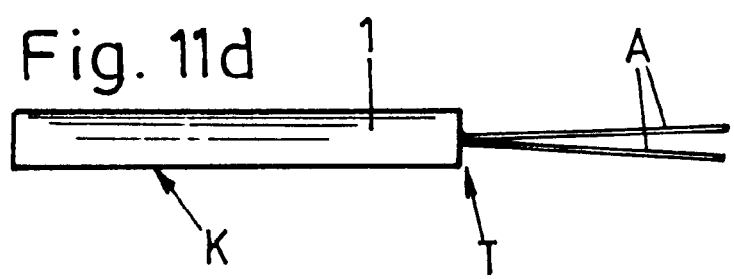
Figure 11:
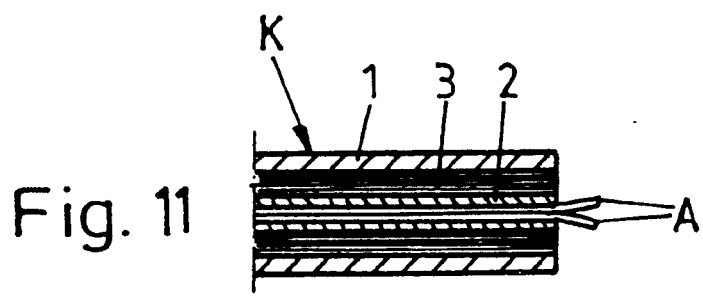
FIG. 11 shows a longitudinal section through a cable comprising cable cores, an inner insulation, insulation fibers surrounding the inner insulation and an outer cable insulation surrounding the fibers and insulation.

Now, in accordance with FIG. 11b, the insulation fibers (3) are exposed and can be severed at the stripping point (T) with the cutting blade (10) that has been extended out of the tool in that the fibers are gathered into a bundle by hand and severed in the direction of the stripping point (T), so the inner insulation (2) with the cores (A) located therein is exposed. This inner insulation (2) can now also be removed in that, with the tool being open, the cable (K) is laid with the insulation (2) between cutters (9) having a small spacing (S2), and the outer insulation (1) is severed by the closing of the jaws (4, 5) and can be removed, exposing the cores (A) in accordance with FIG. 11d.

When the tool is not in use, the two jaws (4, 5) are closed and are locked by the interlocking bar (16), with the cutting blade (10) being retracted.

Also, the jaws (4, 5) can be locked during operation with only the extended cutting blade (10). Two gripping catches (18) are formed on the jaws (4, 5) in the separating plane. The jaws (4, 5) are produced in one piece from plastic. The gripping catches (18) form between themselves a recessed grip (18a) for one finger of the hand.

The modified embodiment of the stripping tool in accordance with FIGS. 12 through 14 corresponds in principle and function to the tool according to FIGS. 1 through 10; the same reference characters are used for identical components.

The modification involves the ability of the cutting blade (10) to be pushed out of the same tool end face (SE) in which the blades (6, 7) are disposed. This precludes the risk of injury to the user's hand.

The blades (6, 7) are secured in protruding catches (19) formed onto the end face (SE) of the jaws (4, 5), outside of the displacement guide (22) of the cutting blade (10).

In the region of the catches (19), the jaws (4, 5) have recessed grips (20) and, at one jaw (4 or 5), a clip (21) is provided in the longitudinal end facing away from the catches (19), which permits the tool to be secured in a readily-accessible manner in a clothing pocket.

The foregoing description of the specific embodiments will so fully reveal the general nature of the invention that others can, by applying current knowledge, readily modify and/or adapt for various application such specific embodiments with out departing from the generic concept, and therefore such adaptations and modifications are intended to be comprehended within the meaning and range of equivalents of the disclosed embodiments. It is to be understood that the phraseology or terminology herein is for the purpose of description and not of limitation.

All references cited in this specification are hereby incorporated by reference.

What is claimed:

1. A stripping tool for removing insulation of single- or multi-core electrical cable having an outer cable insulation (1), an inner cable-core insulation (2), and fibers (3) therebetween; the tool having a first tool end and a second tool end; the tool comprising:

two trough-shaped jaws hinged together so as to pivot toward one another about a pivoting axis defining a longitudinal direction;

stripping blades (6,7) adjacent the first tool end, each of the laws comprising a respective one of the stripping blades, the stripping blades extending transversely to the longitudinal direction of the jaws, the stripping blades including opposing cutting edges (8, 9), which are disposed with different gap spacings (S1, S2) from one another, wherein the cutting edges are substantially straight and generally parallel to one another;

the gap spacings including a first gap spacing adapted for stripping the outer cable insulation (1) and a second gap spacing adapted for stripping the inner cable-core insulation (2); and a cutting blade (10) held on an inside of one of the laws so as to be displaceable within a guide, the cutting blade extending in the longitudinal direction and being extendable out of said second end opposite the stripping blades (6, 7) into a functional position for cutting the fibers (3) between the outer and inner insulations (1, 2).

2. The stripping tool according to claim 1, wherein the two stripping blades (6, 7) are secured opposite one another in a respective one of the jaws (4, 5), each of said two blades including a respective stop (11) that abuts a stop of the other blade in a stripping position of the laws, the cutting edges (8, 9) being located on opposite sides of each stop.

3. The stripping tool according to claim 1, wherein the two stripping blades (6, 7) lie in a common plane perpendicular to a longitudinal direction of the jaws, and the cutting edges (8, 9) of the two pair of cutters being parallel to one another.

4. The stripping tool according to claims 1 wherein the cutting blade (10) is oblong and comprises break-off blade segments (10a).

5. The stripping tool according to claim 1 comprising a guide rail (22) having a C-shaped cross section for the cutting blade (10) secured on the inside (4), and the cutting blade (10) includes a sliding handle (12) that engages a latch (13) of the guide rail (22), the cutting blade being displaceable in increments in the guide rail (22).

6. The stripping tool according to claim 5 wherein the guide rail (22) extends over substantially an entire length of the jaws, lies with one end thereof spaced in front of the stripping blades (6, 7) and, with another end thereof, forms a guide end (22a) that exits the second tool end.

7. The stripping tool according to claim 1 wherein the cutting blade (10) is extendable out of the second tool end.

8. The stripping tool according to claim 1 wherein the two jaws (4, 5) forming semicircular troughs are connected to one another so as to be separated and brought together by one or more hinges (14) located at one jaw edge, and a compression spring (15) that pivots the jaws (4, 5) open is disposed around at least one hinge (14), and the jaws (4, 5) can be locked against one another in the closed position by an interlocking bar (16).

9. The stripping tool according to claim 1 wherein the jaws (4, 5) include at edges opposite the hinges (14) gripping catches (18) that form between themselves a recessed grip (18a).

10. The stripping tool according to claims 5 wherein the cutting blade (10) is extendable out of the second tool end.

11. The stripping tool according to claim 10, wherein the stripping blades (6, 7) are secured in protruding catches (19) formed onto the end face (SE) of the jaws (4, 5), outside of the guide (22) of the cutting blade (10).

12. The stripping tool according to claim 11, wherein adjacent to the catches (19), the jaws (4, 5) include recessed grips (20) and, one jaw (4 or 5) includes a clip (21) in a longitudinal end facing away from the catches (19), which permits the tool to be secured in a readily-accessible manner in a clothing pocket.

* * * * *